(12) United States Patent
Musale

(10) Patent No.: US 7,658,443 B2
(45) Date of Patent: Feb. 9, 2010

(54) INBOARD BUCKLE ATTACHMENT FOR A FOUR-WAY SEAT

(75) Inventor: Gopal Musale, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 410 days.

(21) Appl. No.: 11/296,158

(22) Filed: Dec. 7, 2005

(65) Prior Publication Data

US 2007/0126277 A1 Jun. 7, 2007

(51) Int. Cl.
*B60N 2/427* (2006.01)
(52) U.S. Cl. .................... 297/216.1; 297/216.2
(58) Field of Classification Search .......... 297/216.1, 297/468, 470, 472, 344.15, 216.13, 344.13, 297/344.17, 216.2; 248/421
See application file for complete search history.

(56) References Cited

U.S. PATENT DOCUMENTS

| | | | | |
|---|---|---|---|---|
| 4,225,184 A * | 9/1980 | Strowick | ................... | 297/468 |
| 4,676,555 A * | 6/1987 | Tokugawa | ................... | 297/473 |
| 4,913,497 A | 4/1990 | Knabel et al. | | |
| 4,923,214 A * | 5/1990 | Siegrist et al. | ............... | 280/806 |
| 5,924,730 A | 7/1999 | Burrow et al. | | |
| 5,944,350 A | 8/1999 | Grabowski et al. | | |
| 6,039,352 A | 3/2000 | Wier | | |
| 6,116,689 A * | 9/2000 | Bauer et al. | ............ | 297/344.15 |
| 6,126,241 A | 10/2000 | Wier | | |
| 6,149,242 A | 11/2000 | Pesta et al. | | |
| 6,155,727 A | 12/2000 | Wier | | |
| 6,213,513 B1 | 4/2001 | Grabowski et al. | | |
| 6,264,281 B1 | 7/2001 | Dukatz et al. | | |
| 6,382,718 B1 * | 5/2002 | Janke et al. | ............ | 297/216.16 |
| 6,467,849 B1 * | 10/2002 | Deptolla | ..................... | 297/464 |
| 6,478,378 B2 * | 11/2002 | Muhlberger et al. | ... | 297/344.12 |
| 6,505,888 B1 * | 1/2003 | Teufel et al. | ........... | 297/344.15 |
| 6,533,351 B2 * | 3/2003 | Deptolla | ................... | 297/216.2 |
| 6,572,065 B2 * | 6/2003 | Koga et al. | ................... | 248/421 |
| 6,582,023 B2 * | 6/2003 | Houston et al. | ............. | 297/470 |
| 6,659,548 B2 * | 12/2003 | Becker et al. | ............ | 297/216.1 |
| 6,733,075 B2 * | 5/2004 | Schumann et al. | ..... | 297/344.12 |
| 6,851,753 B2 * | 2/2005 | Akaike et al. | ........... | 297/344.17 |
| 6,902,234 B2 * | 6/2005 | Becker et al. | ............ | 297/216.1 |
| 6,932,324 B2 | 8/2005 | Biller et al. | | |
| 7,036,878 B2 * | 5/2006 | Masutani | ................... | 297/216.1 |
| 7,338,118 B2 * | 3/2008 | Ichikawa et al. | ......... | 297/216.1 |
| 2002/0011746 A1 * | 1/2002 | Muhlberger et al. | ... | 297/344.12 |
| 2002/0024242 A1 * | 2/2002 | Becker et al. | ............ | 297/216.1 |
| 2002/0053252 A1 * | 5/2002 | Duffy | ........................ | 74/492 |
| 2003/0102701 A1 * | 6/2003 | Pedronno et al. | ......... | 297/216.1 |
| 2005/0134099 A1 * | 6/2005 | Masutani | ................. | 297/216.1 |
| 2006/0061176 A1 * | 3/2006 | Sakai et al. | ............ | 297/344.15 |
| 2008/0093899 A1 * | 4/2008 | Stueckle | ................... | 297/216.1 |

* cited by examiner

*Primary Examiner*—David Dunn
*Assistant Examiner*—James Alex
(74) *Attorney, Agent, or Firm*—Ralph E. Smith

(57) ABSTRACT

The inboard buckle for a four-way seat is attached to the seat through a variable buckle guide. Attaching the inboard buckle to the seat allows the buckle to move with the seat and obviates the need for a long buckle which introduces undesirable slack into the seat belt system during a crash event. Since the buckle moves with the seat, it remains in a location that is convenient for the occupant and provides the maximum occupant protection. The variable buckle guide is attached to the upper rail supporting the seat, and in a crash event, the variable buckle guide transfers the occupant load on the belt to the upper rail, avoiding distortion of the seat or the height adjusting levers supporting the seat, and thus precludes slack in the belt caused by such distortion.

19 Claims, 4 Drawing Sheets

INBOARD BUCKLE ATTACHMENT FOR A FOUR-WAY SEAT

FIELD OF THE INVENTION

The invention relates generally to a seat belt system and more particularly to an inboard buckle attachment in a seat belt system.

BACKGROUND OF THE INVENTION

Modern seat belt restraining systems utilize a three-point belt that is anchored on the B-pillar above the occupants shoulder, to the floor next to the B-pillar, and to an inboard buckle positioned next to the seat in a region adjacent to the occupant's hips. The inboard buckle secures two portions of the seat belt strap to the inboard anchor point, the portion that extends from the B-pillar over the occupant's outboard shoulder across the chest and to the waist on the inboard side, and the portion that extends from the outboard anchor point on the floor to the waist of the occupant.

A two-way seat is one that moves fore and aft, with no up and down position adjustment of the seat possible. An inboard buckle may be attached to a two-way seat without comprising the safety provided by the seat belt since the seat can be securely fastened to the upper rail and the engagement of the upper rail with the lower rail is one which will resist occupant loads on the belt in a crash event.

A four-way seat is one that is adjustable fore and aft, and also up and down to accommodate the physical dimensions and comfort of the occupant. Not only does a four-way seat provide additional motion to the seat that has to be accommodated in the design of the seat belt and the inboard buckle, it also introduces another element into the support system for the seat, pairs of levers that are pivoted together to open and close with a folding motion to raise and lower the seat. The pivoted levers are prone to distortion in a crash event and hence result in seat motion. Further, because of the location and design of the pivoted levers, in a crash event, the levers tend to unfold, pitching the seat forward and upward. If the inboard buckle is attached to the seat, this motion of the seat creates slack in the seat belt.

SUMMARY OF THE INVENTION

A variable buckle guide is provided for the inboard buckle of a seat belt system for a four-way seat. The variable buckle guide permits attachment of the inboard buckle to the seat, so that the buckle mechanism remains positioned for convenient use by the occupant regardless of the position of the seat. In a crash event, the occupant load on the belt is transferred from the inboard buckle to the rails on which the seat is mounted to avoid distortion of the seat.

BRIEF DESCRIPTION OF THE DRAWINGS

These and other objects, features and advantages of the present invention will be apparent from the following detailed description of the preferred embodiments and best mode, appended claims and accompanying drawings in which:

DETAILED DESCRIPTION OF PREFERRED EMBODIMENTS

Figure 1:
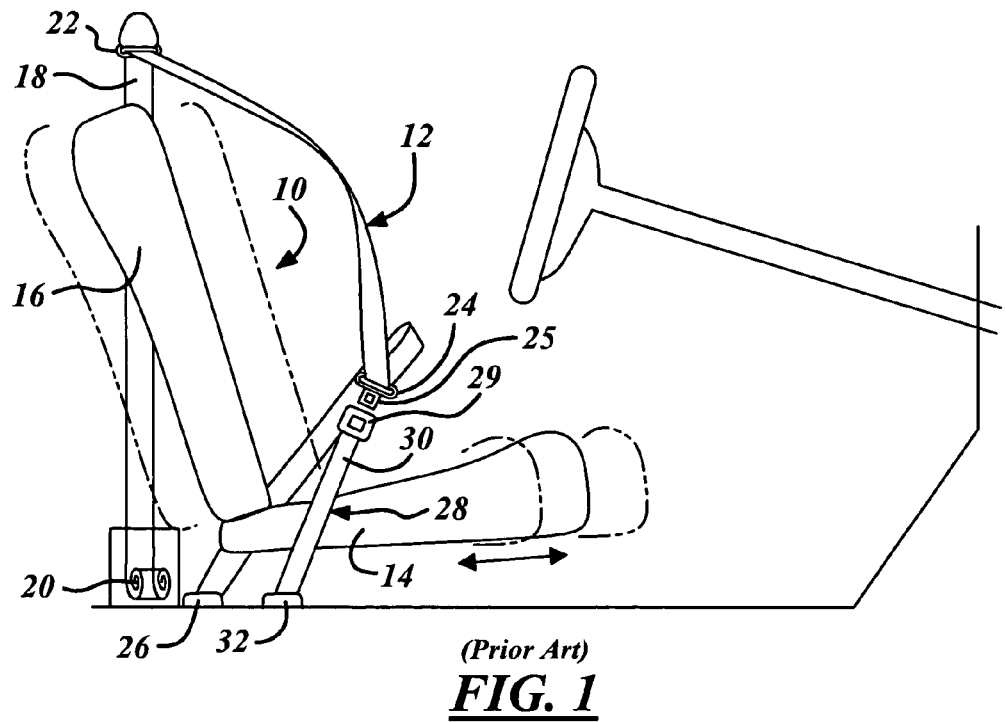
FIG. 1 is a side view of the inboard side of a vehicle seat showing the anchoring points for a seat belt restraining system according to the prior art.

FIG. 1 shows the inboard side of typical seat 10 and a seat belt restraining system 12 used in a modern automobile vehicle. The seat 10 includes a lower cushion 14 and a back cushion 16. A seat belt strap 18 extends from a spring loaded spool 20 mounted in the B-pillar of the vehicle up through a shoulder guide 22 mounted on the B-pillar. The strap extends from the shoulder guide 22 to an inboard guide 24 and from the inboard guide 24 to a floor mounted anchor point 26 on the outboard side of the seat 10. The spring-loaded spool 20 may include a pretensioning device to take up slack in the strap 18 in a crash event as is well known in the art. The inboard guide 24 is mounted on the end of a tongue 25 which engages an inboard buckle 28. The inboard buckle 28 comprises a buckle mechanism 29 that is mounted on one end of an extension strap 30, the opposite end of which is attached to an inboard anchor 32 on the floor of the vehicle.

Figure 2:
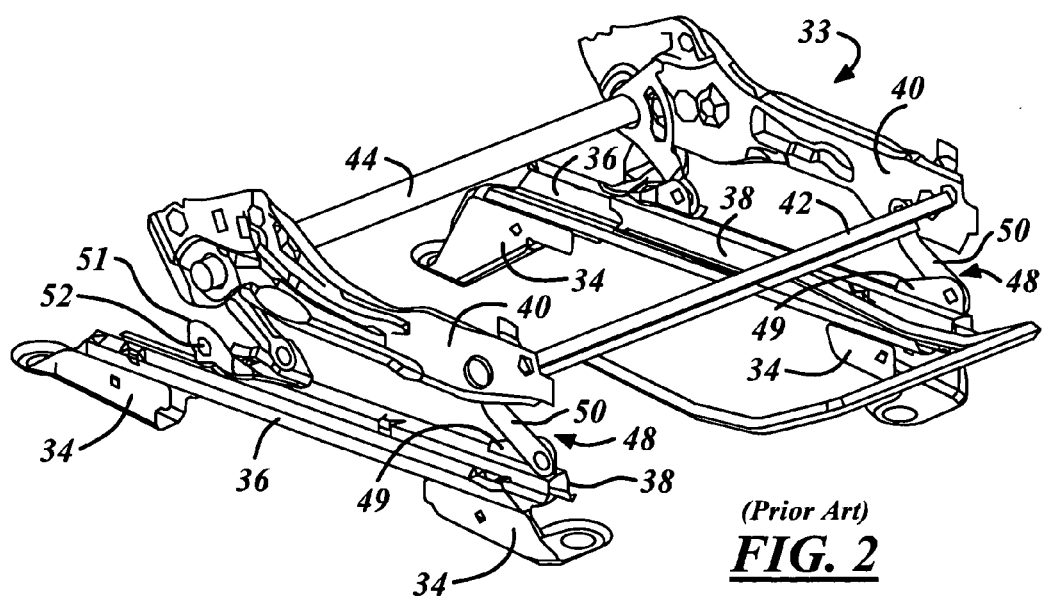
FIG. 2 is a perspective view showing the lower frame elements of a four-way seat.
Figure 3:
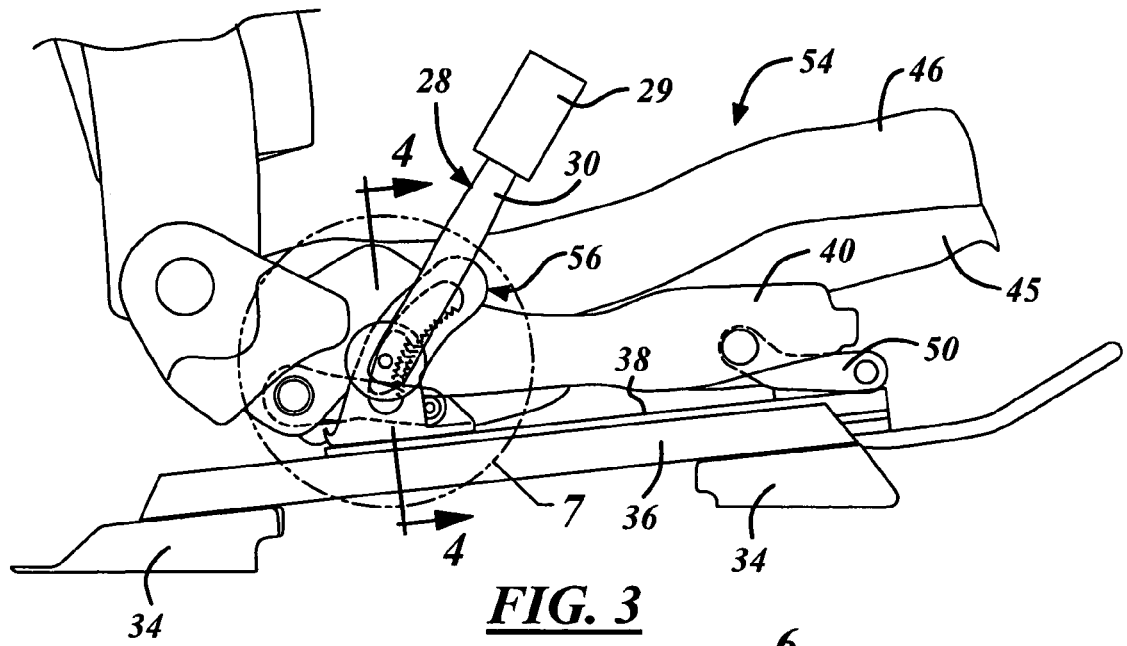
FIG. 3 is a side view of a seat in a lowered position showing the inboard buckle.
Figure 6:
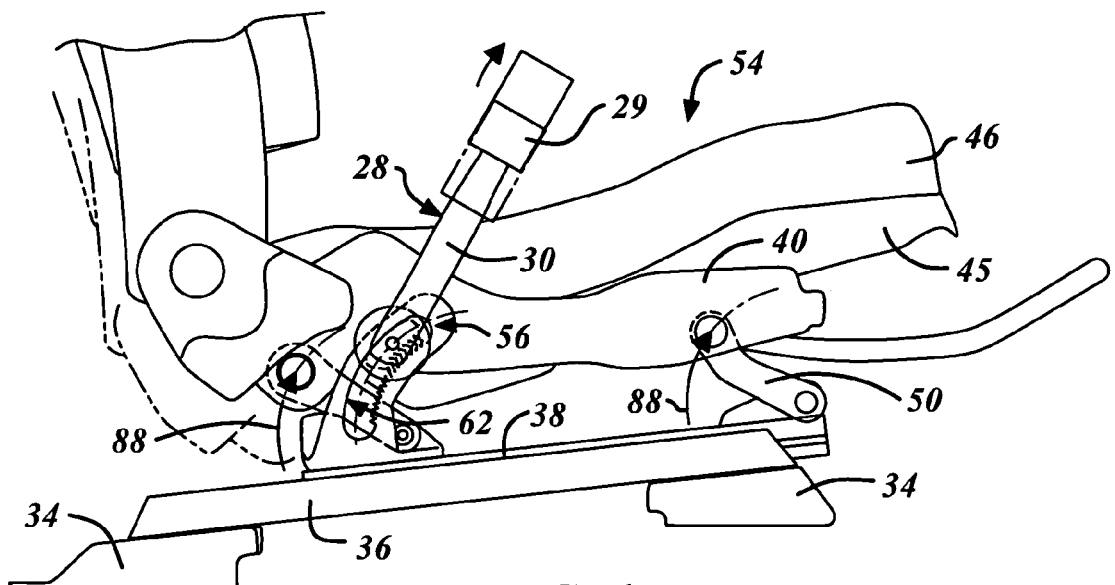
FIG. 6 is a view similar to FIG. 3 but with the seat in a raised position.

FIG. 2 is a perspective view showing the lower frame 33 of a modern four-way seat and its attachment to the floor of a vehicle. Four mounting pads 34 for the seat are attached to the floor of the vehicle. Two parallel lower rails 36 running fore and aft are secured to the mounting pads 34. Two upper rails 38 are slidably mounted to the lower rails 36 and are interlocked with the lower rails to allow sliding motion in the fore and aft directions, but to prohibit up and down or rotary motion relative to the lower rails. The bottom of the seat frame is formed by two side members 40, a front crossbeam 42, and a rear cross beam 44. A seat pan 45, omitted for clarity in this view, but partially shown in FIGS. 3 and 6, spans the width of the seat and is supported by the two side members 40, and the two cross beams 42,44. The seat pan 45 supports a seat cushion 46 as shown in FIGS. 3 and 6. Four pairs of folding links 48 are positioned one each at the four corners of the seat to permit the height of the seat to be adjusted relative to the upper rails. The pairs of folding links each comprise a fixed link 49 that is attached to the upper rail 38 and a lifting link 50 that is pivoted at one end to the fixed link 49 and at the other end to one of the side members 40. A suitable mechanism is used to raise and lower the seat as well known in the art. An inboard bracket 51 is attached to the upper rail 38, and moves fore and aft with the seat. The inboard bracket 51 does not move up and down with the seat. An inboard buckle is normally attached to a mounting aperture 52 on the inboard bracket 51. The upper and lower rails, the frame members for the seat, the lifting levers and the inboard bracket are all fabricated from steel, aluminum, or other metal alloy, as is the common practice in the art.

FIG. 3 shows the inboard side of a seat 54 with a variable buckle guide 56 attached to the upper rail 38. The extension strap 30 of the inboard buckle 28 is attached to the side member of the seat through the variable buckle guide 56 as more fully explained below. The extension strap 30 may be made from metal, or seat belt strap material that is stiffened with a plastic or fiber covering so that the buckle will be extended from the seat toward the occupant. Since the inboard buckle 28 is attached to the seat, the inboard buckle 28 moves fore and aft, and up and down with the seat. The typical length of an inboard buckle that is attached to and moves with the seat is between 150 and 200 mm. This positions the buckle mechanism 29 at about the midpoint of the occupant's hips for maximum occupant protection in a crash event for all positions of the seat. Attaching the inboard buckle to the seat allows the occupant to comfortably and easily locate the buckle mechanism 29 and clinch the tongue portion 25 of the buckle into the buckle mechanism 29, regardless of the position of the seat. The variable buckle guide 56 preferably is bolted, welded or otherwise attached to the upper rail 38 and moves fore and aft with the upper rail and with the seat that is attached thereto. The variable buckle guide 56 does not move up and down with the seat when the height of the seat is adjusted by the occupant.

Figure 4:
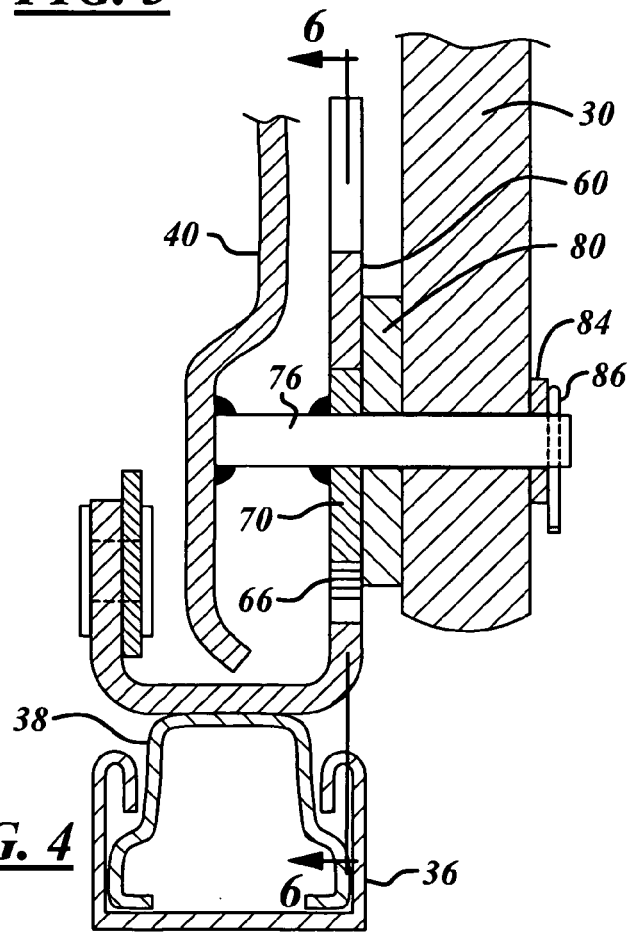
FIG. 4 is a detail view partly in section taken along line 4-4 of FIG. 3.
Figure 5:
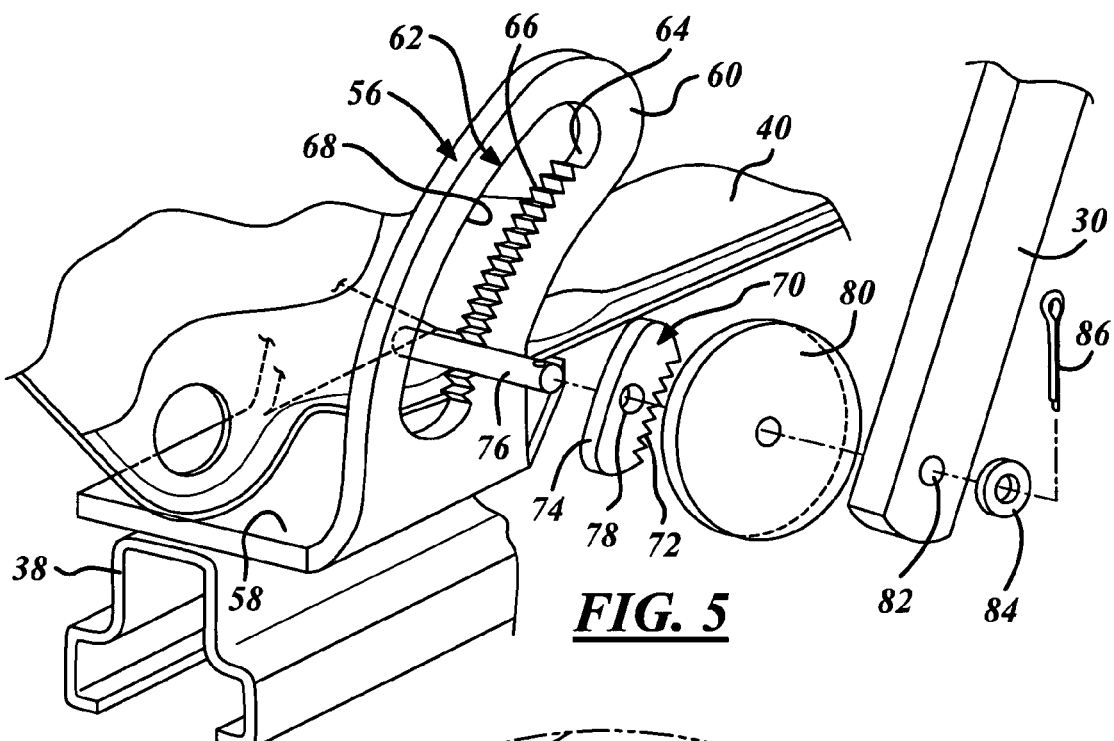
FIG. 5 is an exploded perspective view of a variable buckle guide.

FIGS. 4 and 5 show the variable buckle guide 56 and the components used to attach the inboard buckle 28 to the seat. The variable buckle guide 56 comprises a base plate 58 and an upright guide plate 60 with an elongated arcuate slot 62. A lower convex portion 64 of the arcuate slot 62 is formed with serrations or teeth 66. The teeth 66 formed in the arcuate slot 62 comprise a first set of teeth. An upper concave side 68 of the arcuate slot is smooth. An elongated plate or bug gear 70 fits inside of the arcuate slot 62 and has serrations or teeth 72 formed along the side of the gear that is opposite the teeth 66 formed in the slot. The teeth 72 formed on the bug gear 70 comprise a second set of teeth. The opposite side 74 of the bug gear is smooth. The dimensions of the bug gear 70 are such that it is able to slide in the arcuate slot 62 with the smooth side 74 of the bug gear in contact with the smooth side 68 of the arcuate slot without the teeth 72 of the bug gear coming into contact with the teeth 66 of the slot. The bug gear is formed with a mounting aperture 78.

A fastener such as a mounting post 76 is used to attach the inboard buckle 28 to the seat. One end of the mounting post 76 is welded or otherwise securely attached to the side member 40 of the seat. The mounting post extends through the arcuate slot 62 in the variable buckle guide 56. The bug gear 70 is attached to the mounting post 76 by welding or an interference fit, and is positioned in the arcuate slot 62. A load washer 80 and the extension strap 30 are mounted on the mounting post 76 so that the load washer is between the upright guide plate 60 of the variable buckle guide and the extension strap 30. A mounting aperture 82 is formed in the end of the extension strap 30 to receive the mounting post 76. The load washer 80 distributes forces from the extension strap 30 to a large area on the upright guide plate 60, and helps to prevent inward motion of the extension strap toward the seat or the occupant in a crash event. A small washer 84 and a mechanical fastener 86 such as a pin or a circular clip are used to retain the extension strap 30 and the load washer 80 on the mounting post 76. The variable buckle guide 56, the mounting post 76, the bug gear 70 and the load washer 80 may be fabricated from steel or aluminum or other metal or metal alloy having sufficient strength and wear characteristics to withstand the loads to which they will be subjected.

FIG. 6 is a side view of the seat 54 showing the arcuate path taken by the seat as the height of the seat is adjusted up or down using the lifting links 50. The arcuate slot 62 in the variable buckle guide 56 is the same shape as the path taken by the seat 54 and shown by the arrows 88 as it is adjusted up and down to allow the mounting post 76 and the bug gear 70 to move freely in the arcuate slot 62.

Figure 7:
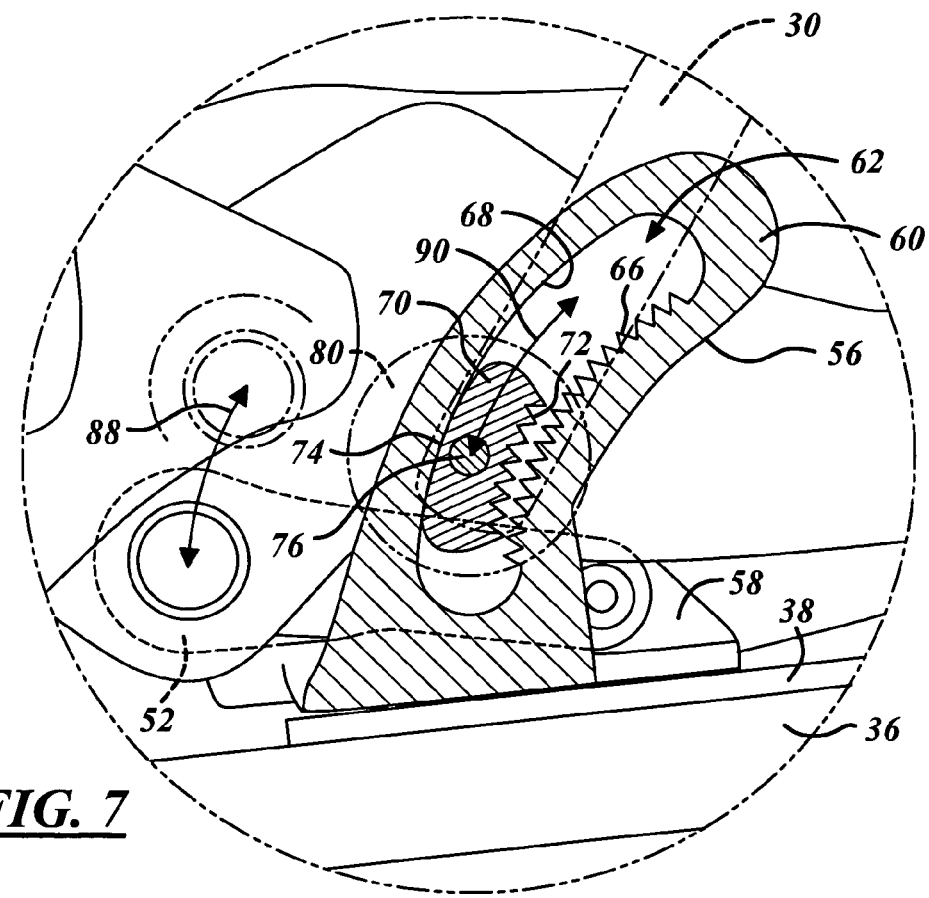
FIG. 7 is an enlarged view of the encircled portion 7 of FIG. 3 showing the motion of a gear in the variable buckle guide when the height of the seat is being adjusted.

FIG. 7 is a detail view of the variable buckle guide 56 and the bug gear 70 showing the motion of the bug gear along the arrow 90 as the height of the seat is adjusted up and down. The smooth side 74 of the bug gear 70 slides along the smooth concave surface 68 of the arcuate slot 62, and there is sufficient clearance between the teeth 72 of the bug gear and the teeth 66 of the slot that the teeth do not come into contact with one another.

Figure 8:
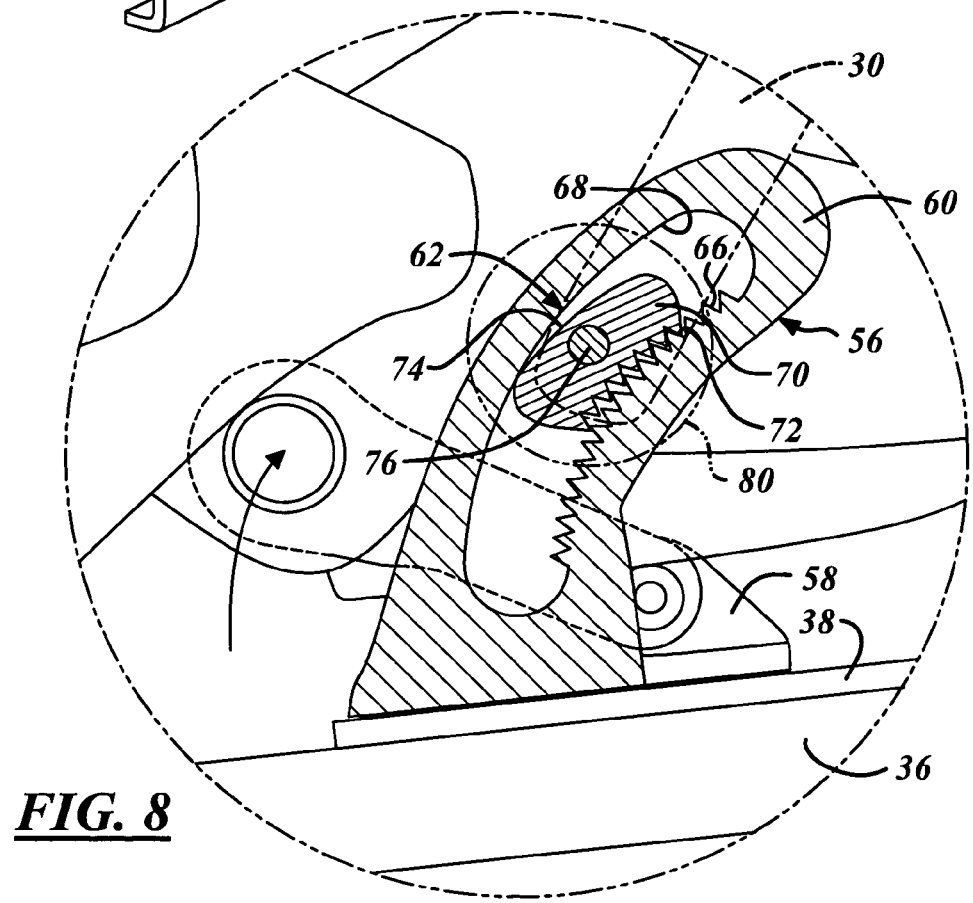
FIG. 8 is a view like FIG. 7 showing the gear in the variable buckle guide in the locked position during a crash event.

FIG. 8 shows the motion of the bug gear 70 in a crash event. The forces in a crash event bend the mounting post 76 causing the bug gear to skew relative to the arcuate slot 62, bringing the uppermost teeth 72 on the bug gear into contact with the teeth 66 of the arcuate. The lower smooth surface 74 of the bug gear comes into in contact with the smooth concave side 68 of the slot 62. This position of the bug gear 70 causes it to bind in the slot 62 and transfers the load on the inboard buckle 28 to the variable buckle guide 56 which is attached to the upper rail 38. Thus, the load on the inboard buckle 28 is transferred to the upper rail 38, and is diverted from the side member 40 of the seat. As a result, the seat and the folding links 48 do not receive the occupant load, do not distort, and do not create slack in the seat belt system, allowing the seat belt system to protect the occupant as intended.

In operation, the seat and the seat belt are able to be used in the normal way. The seat 54 will move fore and aft, and up and down as required by the occupant. When moving the seat fore and aft, there is no motion of the bug gear 70 in the arcuate slot 62 since the variable buckle guide 56 is attached to the upper rail 38 and moves with the seat. When moving the seat up and down, the bug gear 70 will change position in the arcuate slot 62 as the mounting post 76 moves with the seat without the teeth 72 of the gear engaging the teeth 66 of the slot. The inboard buckle 28 will move with the seat since it is attached to the side member 40 of the seat, and therefore the inboard buckle mechanism 29 maintains a constant position relative to the seat, and will remain convenient to the occupant. Since the inboard buckle moves with the seat, it can be short, between 150 and 200 mm in length, and it remains close to the occupant's body.

In a crash event, occupant loads are transferred from the belt 18 to the inboard buckle 28 and to the mounting post 76. The force on the inboard buckle 28 is distributed over the upright guide plate 60 of the variable buckle guide by the load washer 80. The upright guide plate 60 helps to prevent inward motion of the inboard buckle 28 toward the occupant, a potential source of slack in the seat belt 18. The forces on the bug gear 70 causes it to rotate in the arcuate slot 62, and causes the upper teeth 72 on the bug gear to lock with the teeth 66 in the arcuate slot. This transfers the load from the inboard buckle 28 to the variable buckle guide 56, and to the upper track 38 to which the variable buckle guide 56 is attached. As a result, the load from the inboard buckle 28 is not transferred to the side member 40 of the seat, preventing local deformation of the side member and the folding links 48. This maintains the tightness of the seat belt 18 around the occupant, minimizing injury to the occupant.

Having thus described a presently preferred implementation of the invention, various modifications and alterations will occur to those skilled in the art. For example, while the base portion of the variable buckle guide is shown in the illustrated embodiment as being generally perpendicular to the upright portion, arrangements can be used. The base and upright portion may be generally in-line, or at any desired angle relative to each other. Still other modifications and embodiments will be apparent from this disclosure. The scope of the invention is defined by the appended claims.

What is claimed is:

1. A variable buckle guide for attaching an inboard buckle to a seat, the seat being mounted on a pair of rails and being generally vertically movable relative thereto, wherein the variable buckle guide is mounted to at least one of said rails and is immovable relative thereto, the variable buckle guide further comprising:
   an upright portion extending upwardly along a side of the seat that is fixed to an adjacent rail and that has a slot formed therein;
   a fastener that is fixed at one end to a side of the seat, passes through the slot, and is fixed at the other end to the inboard buckle, whereby the inboard buckle moves with the seat and the fastener moves within the slot in the upright portion when the seat is moved up and down relative to the pair of rails, and whereby occupant loads on the inboard buckle in a crash event are transferred to the adjacent rail by the variable buckle guide from mechanical engagement caused by force from the occupant loads.

2. The variable buckle guide of claim 1 wherein the slot is arcuate and corresponds in shape to the path taken by the seat as the seat is adjusted up and down.

3. The variable buckle guide of claim 2 further comprising:
   a gear attached to the fastener and located in the arcuate slot, the gear being configured to travel in the slot moving in unison with the seat, fastener and inboard buckle as the height of the seat is adjusted without the gear binding in the slot, the gear further being configured to bind in the slot in response to occupant loads on the inboard buckle during a crash event.

4. The variable buckle guide of claim 3 wherein the gear is elongate, the slot is defined by a plurality of opposed slot-defining side edges, and the variable buckle guide further comprises:
   a first set of teeth formed in one of the slot-defining side edges of the arcuate slot and a second set of teeth formed on one side of the gear, the teeth on the gear engaging the teeth formed in the one of the slot-defining sides edges of the arcuate slot during a crash event.

5. The variable buckle guide of claim 1 further comprising:
   a load washer attached to the fastener and located between the inboard buckle and the upright portion, the load washer distributing occupant loads in a crash event across the surface of the upright portion.

6. The variable buckle guide of claim 5 wherein the load washer inhibits inward motion of the inboard buckle toward the occupant during a crash event.

7. The variable buckle guide of claim 3 further comprising:
   a load washer attached to the fastener and located between the inboard buckle and the variable buckle guide, wherein the load washer distributes occupant loads in a crash event across the surface of the upright portion of the variable buckle guide and wherein the load washer inhibits inward motion of the inboard buckle during a crash event.

8. An inboard buckle attachment for a four-way seat, the seat being mounted on upper and lower rails for adjusting the position of the seat fore and aft and on a mechanism for adjusting the height of the seat up and down, the attachment comprising:
   a variable buckle guide fixed to the upper rail such that it is immovable relative thereto and having a slot with a shape corresponding to the path of the seat as the seat is adjusted up and down;
   a mounting post fixed at one end to a side of the seat, passing through said slot, and fixed at the other end to said inboard buckle; and
   a gear positioned in the slot and engaged by the mounting post, the gear moving freely in the slot as the seat is adjusted up and down and binding in the slot in response to occupant loads on the inboard buckle caused by a crash event, whereby occupant loads in a crash event are transferred from the inboard buckle to the upper rail by the variable buckle guide.

9. The inboard buckle attachment of claim 8 further comprising:
   a load washer located between the inboard buckle and the variable buckle guide, the load washer distributing occupant loads across the surface of the variable buckle guide.

10. The inboard buckle attachment of claim 8 further comprising:
    a first set of teeth comprising a plurality of teeth formed on one side of the slot and a second set of teeth comprising a plurality of teeth formed on one side of the gear, the teeth on the gear engaging the teeth on the arcuate slot during a crash event.

11. The inboard buckle attachment of claim 10 wherein the gear is oblong or elongate and wherein the slot is arcuate and comprised of a pair of generally arcuate slot-defining side edges with the second set of teeth formed in a forward-most disposed slot-defining side edge.

12. An inboard buckle attachment for a four-way seat, the seat being mounted on upper and lower rails for adjusting the position of the seat fore and aft and on a mechanism for adjusting the height of the seat up and down, the attachment comprising:
    a variable buckle guide comprised of an upright plate extending upwardly along an adjacent side of the seat that is immovably attached to an adjacent one of the rails and which has a generally vertically extending elongate slot formed therein defined by a pair of opposed slot-defining side edges one of which has a plurality of teeth formed therein;
    a mounting post fixed at one end to a side member of the seat, the mounting post extending outwardly from the side member through the slot in the variable buckle guide plate and fixed at the other end to a portion of an inboard buckle;
    an elongate gear having a plurality of teeth formed therein that is fixed to the mounting post and received in the slot in the variable buckle guide plate for movement in the slot substantially in unison with the mounting post, seat and inboard buckle without any one of the plurality of teeth of the gear engaging any one of the plurality of teeth in the one side edge of the slot during up and down adjustment of the seat relative to the upper and lower rails; and
    wherein the plurality of teeth of the gear mechanically engage the plurality of teeth in the one side edge of the slot from rotation of the gear in the slot in response to an occupant load on the inboard buckle caused by a crash event that transfers the occupant load from the inboard buckle via the upright plate of the variable buckle guide to the one of the rails.

13. The inboard buckle attachment of claim 12 wherein the slot formed in the upright plate comprises an arcuate slot, wherein the slot-defining side edge in which the plurality of teeth are formed is the forward-most disposed slot-defining side edge; and further comprising a load washer carried by the mounting post between the inboard buckle and the upright plate of the variable buckle guide.

14. The inboard buckle attachment of claim 13 wherein the arcuate slot formed in the upright plate extends generally upwardly and generally forwardly in a fore direction.

15. The inboard buckle attachment of claim 12 wherein the variable buckle guide further comprises a generally horizontally extending base plate that is fixed to an adjacent upper rail with the upright plate extending upwardly from the base plate, wherein the elongate gear is fixed to the mounting post, and wherein the mounting post extends through the slot.

16. The variable buckle guide of claim 4 wherein there are no teeth formed on the other side of the gear such that the other side of the gear is smooth and there are no teeth formed in another slot-defining side edge of the arcuate slot that opposes the smooth side of the gear.

17. The variable buckle guide of claim 6 further comprising an elongate gear attached to the fastener having a pair of elongate side edges with one of the side edges having a first set of a plurality of teeth formed in one of the side edges and disposed in the slot with the slot being arcuate and having a second set of a plurality of teeth formed in one of a pair of opposed elongate slot defining edges that engage the first plurality of teeth formed in the one of the gear side edges during a crash event.

18. The inboard buckle attachment of claim 8 wherein the gear is fixed to the mounting post and the mounting post extends outwardly from part of the seat and the inboard buckle is disposed outwardly of the variable buckle guide such that the variable buckle guide and gear are disposed between the seat and the inboard buckle.

19. The inboard buckle attachment of claim 12 wherein the slot is arcuate and corresponds in shape to the path taken by the seat as the seat is adjusted up and down, wherein the variable buckle guide plate and gear are disposed between the side member of the seat and the inboard buckle, and further comprising a load washer disposed between the variable buckle guide plate and the inboard buckle that inhibits inward motion of the inboard buckle toward the occupant during a crash event.

* * * * *